(12) United States Patent
Zhang et al.

(10) Patent No.: US 11,339,981 B2
(45) Date of Patent: May 24, 2022

(54) DEHUMIDIFIER

(71) Applicants: GD MIDEA AIR-CONDITIONING EQUIPMENT CO., LTD., Foshan (CN); MIDEA GROUP CO., LTD., Foshan (CN)

(72) Inventors: Zhiming Zhang, Foshan (CN); Xiaoyu Wang, Foshan (CN)

(*) Notice: Subject to any disclaimer, the term of this patent is extended or adjusted under 35 U.S.C. 154(b) by 322 days.

(21) Appl. No.: 16/497,125

(22) PCT Filed: Aug. 21, 2019

(86) PCT No.: PCT/CN2019/101720
§ 371 (c)(1),
(2) Date: Sep. 24, 2019

(87) PCT Pub. No.: WO2020/192003
PCT Pub. Date: Oct. 1, 2020

(65) Prior Publication Data
US 2021/0332992 A1   Oct. 28, 2021

(30) Foreign Application Priority Data

Mar. 22, 2019 (CN) .......................... 201910223062.1
Mar. 22, 2019 (CN) .......................... 201920373519.2

(51) Int. Cl.
*F24F 8/10* (2021.01)
*F24F 3/14* (2006.01)
(Continued)

(52) U.S. Cl.
CPC .......... *F24F 3/1405* (2013.01); *B01D 53/265* (2013.01); *F24F 8/10* (2021.01);
(Continued)

(58) Field of Classification Search
CPC .............................. F24F 13/222; F24F 3/1405
See application file for complete search history.

(56) References Cited

U.S. PATENT DOCUMENTS 6,651,690 B1 * 11/2003 Coogle ................... C02F 1/688
137/268
6,892,907 B2 * 5/2005 Varney .................. F24F 13/222
222/527
(Continued)

FOREIGN PATENT DOCUMENTS

CN     203704293 U     7/2014
CN     108050602 A     5/2018
(Continued)

OTHER PUBLICATIONS

Machine Translation of description of CN 203704293 to TCL, Jul. 9, 2014; all, eSpacenet (Year: 2014).*
(Continued)

*Primary Examiner* — Filip Zec
(74) *Attorney, Agent, or Firm* — Anova Law Group PLLC

(57) ABSTRACT

A dehumidifier includes a water tank including an accommodating space, a connector male end assembly disposed at the water tank, a middle partition, and a connector female end disposed at the middle partition. The connector male end assembly includes a connector male end including a first end part in communication with the accommodating space and a second end part opposite to and in communication with the first end part. The connector female end includes a first connection end part connected with the second end part and a second connection end part opposite to and in communication with the first connection end part.

20 Claims, 16 Drawing Sheets

(51) Int. Cl.
*B01D 53/26* (2006.01)
*F24F 13/22* (2006.01)
(52) U.S. Cl.
CPC .... *F24F 13/222* (2013.01); *F24F 2003/1446* (2013.01); *F24F 2013/227* (2013.01)

(56) References Cited

U.S. PATENT DOCUMENTS

| | | | | |
|---|---|---|---|---|
| 7,412,987 | B2 * | 8/2008 | Kemper | F24D 3/1008 137/433 |
| 8,752,865 | B1 * | 6/2014 | Coogle | F24F 13/222 137/271 |
| 8,978,690 | B2 * | 3/2015 | Hubbard, Sr. | F28F 17/005 137/557 |

FOREIGN PATENT DOCUMENTS

| | | | |
|---|---|---|---|
| CN | 208059087 U | 11/2018 | |
| CN | 109780642 A | 5/2019 | |
| JP | 1183073 A | 3/1999 | |
| WO | WO-2018034636 A1 * | 2/2018 | ............ F24F 13/222 |

OTHER PUBLICATIONS

World Intllectual Property Organization (WIPO) International Search Report and Written Opinion for PCT/CN2019/101720 dated Dec. 23, 2019 14 Pages.

* cited by examiner

DEHUMIDIFIER

CROSS-REFERENCE TO RELATED APPLICATIONS

The present application is a National Stage Entry under 35 U.S.C. § 371 of International Application No. PCT/CN2019/101720, filed on Aug. 21, 2019, which claims the priority of Chinese Application No. 201910223062.1, filed in the Patent Office of the People's Republic of China on Mar. 22, 2019, and entitled "DEHUMIDIFIER", and Chinese Application No. 201920373519.2, filed in the Patent Office of the People's Republic of China on Mar. 22, 2019, and entitled "DEHUMIDIFIER", the entire contents of all of which are incorporated herein by reference.

FILED

The present application relates to the technical field of air conditioning, and particularly relates to a dehumidifier.

BACKGROUND

In existing dehumidifiers, connector female ends for discharging condensed water in water tanks are fixed by mounting seats. In order to assemble the mounting seat sand a dehumidifier base, the mounting seats are provided with complicated mounting structures. For example, in order to assemble the mounting seat and the base, the mounting seat is provided with, for example, a via hole, a mounting groove, a buckle part, a connection part, etc., resulting in complicated structure of the mounting seat, high cost of the dehumidifier and low assembling efficiency.

SUMMARY

The present application aims at solving at least one of technical problems in the existing art.

An object of the present application is to provide a dehumidifier.

In order to achieve the above object, the technical solution of the present application provides a dehumidifier, including a water tank including an accommodating space; a connector male end assembly disposed at the water tank, wherein the connector male end assembly includes a connector male end, the connector male end includes a first end part and a second end part which are opposite to and in communication with each other, and the first end part is in communication with the accommodating space; and a middle partition and a connector female end, wherein the connector female end is disposed at the middle partition, the connector female end includes a first connection end part and a second connection end part which are opposite to and in communication with each other, and the second end part is connected with the first connection end part.

In the dehumidifier provided by the above technical solution of the present application, the accommodating space is configured to accommodate condensed water produced when the dehumidifier works. The connector male end is connected with the connector female end, so that the connector female end is in communication with the accommodating space. The condensed water in the accommodating space successively passes the connector male end and the connector female end, and then is discharged out of the dehumidifier.

In the present application, the connector female end is directly disposed at the middle partition instead of being disposed at a mounting seat, and the mounting seat is omitted, so that the cost of the dehumidifier is reduced, and the assembling efficiency of the dehumidifier is improved.

Furthermore, the dehumidifier provided by the above technical solution of the present application also has the following additional technical features:

In the above technical solution, the connector male end assembly includes a support. The support is disposed at the water tank, and the connector male end is disposed at the support.

The connector male end is disposed at the water tank through the support, so that the connector male end is fixed on the water tank. The water tank includes a water tank body and a water tank cover disposed at the water tank body. The support may be disposed at the water tank cover, so that the connector male end assembly is disposed at the top of the water tank.

The connector male end is disposed at the support. The connector male end may be fixedly or detachably connected with the support. For example, the connector male end is buckled with the support or connected with the support through a fastener or in bonding connection or soldering connection with the support.

In any one of the above technical solutions, the support is detachably connected with the water tank.

When the water tank needs to be cleaned, or the connector male end assembly needs to be repaired or replaced, the support can be removed from the water tank for easy operation.

In any one of the above technical solutions, the support includes a support body and a connection part. The support body is connected with the water tank through the connection part. The connection part is located outside the accommodating space. An outer wall of the water tank is provided with a first buckle part. The connection part is provided with a second buckle part matched with the first buckle part, and the first buckle part is matched with the second buckle part, so that the water tank is buckled with the support, or the water tank is in thread connection with the connection part, or the water tank is connected with the connection part through screws or bolts.

In order to further improve the convenience for mounting the connection part onto the water tank or removing the connection part from the water tank, the connection part is disposed at the outer side of the accommodating space and detachably connected with an outer surface of a side wall of the water tank body. For example, the connection part is provided with a second buckle part. The outer surface of the side wall of the water tank body is provided with a first buckle part. One of the first buckle part and the second buckle part is a buckling groove, and the other one is a buckle matched with the buckling groove.

In any one of the above technical solutions, the connector male end assembly includes a first water inlet pipe. One end of the first water inlet pipe is connected with the first end part of the connector male end, and the other end of the first water inlet pipe is located in the accommodating space. The connector male end is in communication with the accommodating space through the first water inlet pipe.

In any one of the above technical solutions, the support includes a support body. The water tank is provided with a mounting hole. The support body at least partially stretches into the accommodating space through the mounting hole. A limiting part is disposed at the support body, and the first water inlet pipe is limited in the limiting part.

The support body is disposed at the water tank. The support body extends along a length direction of the first water inlet pipe. The first water inlet pipe is disposed at the support body. In order to position the first water inlet pipe and prevent the shaking of the first water inlet pipe relative to the accommodating space, the limiting part is disposed at the support body. The first water inlet pipe is limited in the limiting part. The limiting part may be a plurality of bulges disposed at the support body. The bulges are respectively located at two opposite sides of the first water inlet pipe. The first water inlet pipe is limited among the bulges.

In any one of the above technical solutions, the other end of the first water inlet pipe is connected with a filter member.

The upper end of the first water inlet pipe is connected with the connector male end, and the lower end of the first water inlet pipe is located at the bottom of the accommodating space. In order to prevent impurities in the condensed water from entering a water pump, blocking the water pump and shortening the service life of the water pump, the lower end of the first water inlet pipe is connected with the filter member. The filter member may be but not limited to a filter screen. The filter screen is sleeved at the lower end of the first water inlet pipe.

In any one of the above technical solutions, the second end part of the connector male end is connected with the first connection end part of the connector female end in a pluggable manner, and a sealing member is disposed between the second end part of the connector male end and the first connection end part of the connector female end.

The first connection end part of the connector female end is sleeved at the outer side of the other end part of the connector male end or the other end part of the connector male end is sleeved at the outer side of the first connection end part of the connector female end, and the other end part of the connector male end is connected with the first connection end part of the connector female end in a pluggable manner, thereby facilitating the connection and disassembling of the connector male end and the connector female end. The sealing member is disposed between the other end part of the connector male end and the first connection end part of the connector female end to realize the sealing between the connector male end and the connector female end. The sealing member may be but not limited to a sealing ring.

The number of the sealing member may be one or more. When a plurality of sealing members are provided, the sealing members are disposed successively along a flowing direction of a water flow.

In any one of the above technical solutions, the first connection end part of the connector female end is sleeved at the outer side of the second end part of the connector male end. A sealing groove for accommodating the sealing member is disposed at the inner side of the first connection end part of the connector female end or the outer side of the second end part of the connector male end. An anti-dropping member is disposed at the inner side of the first connection end part of the connector female end or the outer side of the second end part of the connector male end. The sealing member is limited between the anti-dropping member and the sealing groove. The sealing member is at least partially located in the sealing groove. The anti-dropping member may be a snap spring. The snap spring is disposed at the front end of the connector female end. The front end and the rear end of the connector female end are disposed successively along the flowing direction of the water flow in the connector female end. The anti-dropping member may also be a limiting bulge formed by inwards protruding an inner wall of the first connection end part of the connector female end or a limiting bulge formed by outwards protruding an outer wall of the connector male end. Or, the second end part of the connector male end is sleeved at the outer side of the first connection end part of the connector female end. A sealing groove for accommodating the sealing member is disposed at the inner side of the second end part of the connector male end or the outer side of the first connection end part of the connector female end. An anti-dropping member is disposed at the inner side of the second end part of the connector male end or the outer side of the first connection end part of the connector female end. The sealing member is limited between the anti-dropping member and the sealing groove. The sealing member is at least partially located in the sealing groove. The anti-dropping member may be a snap spring. The snap spring is disposed at the front end of the connector male end. The front end and the rear end of the connector male end are disposed successively along a flowing direction of a water flow in the connector male end. The anti-dropping member may also be a limiting bulge formed by inwards protruding the inner wall of the other end part of the connector male end or a limiting bulge formed by outwards protruding the outer wall of the connector female end.

In any one of the above technical solutions, the first connection end part of the connector female end is sleeved at the outer side of the second end part of the connector male end. The second end part of the connector male end is provided with a first guiding slant. The anti-dropping member is located between the second end part of the connector male end and the first connection end part of the connector female end. The anti-dropping member is provided with a second guiding slant matched with the first guiding slant. The first guiding slant and the second guiding slant are disposed, so that the connector male end can be smoothly inserted into the connector female end. In a direction where the connector male end is inserted into the connector female end, the outer wall of the other end part of the connector male end inclines inwards to form the first guiding slant. The anti-dropping member is sleeved at the outer side of the other end part of the connector male end, and in a direction where the connector male end is inserted into the connector female end, the inner wall of the anti-dropping member inclines inwards. Or, the second end part of the connector male end is sleeved at the outer side of the first connection end part of the connector female end. The first connection end part of the connector female end is provided with a first guiding slant. The anti-dropping member is located between the second end part of the connector male end and the first connection end part of the connector female end. The anti-dropping member is provided with a second guiding slant matched with the first guiding slant. The first guiding slant and the second guiding slant are disposed, so that the connector male end can be smoothly inserted into the connector female end. In a direction where the connector female end is inserted into the connector male end, the outer wall of the first connection end part of the connector female end inclines inwards to form the first guiding slant. The anti-dropping member is sleeved at the outer side of the first connection end part of the connector female end. In the direction where the connector female end is inserted into the connector male end, the inner wall of the anti-dropping member inclines inwards.

In any one of the above technical solutions, the sealing member is in interference fit with the second end part of the connector male end, thereby improving the sealing performance between the sealing member and the connector male end; and/or, the sealing member is in interference fit with the first connection end part of the connector female end, thereby improving the sealing performance between the sealing member and the connector female end.

When the first connection end part of the connector female end is sleeved at the outer side of the other end part of the connector male end, the sealing member is disposed between the first connection end part of the connector female end and the other end part of the connector male end. Specifically, the sealing member is disposed at the inner side of the first connection end part of the connector female end and sleeved at the outer side of the other end part of the connector male end. When the other end part of the connector male end is sleeved at the outer side of the first connection end part of the connector female end, the sealing member is disposed between the first connection end part of the connector female end and the other end part of the connector male end. Specifically, the sealing member is located at the inner side of the other end part of the connector male end and sleeved at the outer side of the first connection end part of the connector female end.

In any one of the above technical solution, the first connection end part of the connector female end is sleeved at the outer side of the second end part of the connector male end. The sealing member is in a ring shape. A difference between an outer diameter of the second end part of the connector male end and an inner diameter of the sealing member is 0.5 mm±0.3 mm, and a difference between an inner diameter of the first connection end part of the connector female end and an outer diameter of the sealing member is 0.5 mm±0.3 mm. Or, the second end part of the connector male end is sleeved at the outer side of the first connection end part of the connector female end, and the sealing member is in a ring shape. A difference between an outer diameter of the first connection end part of the connector female end and an inner diameter of the sealing member is 0.5 mm±0.3 mm, and a difference between an inner diameter of the second end part of the connector male end and an outer diameter of the sealing member is 0.5 mm±0.3 mm.

In any one of the above technical solutions, the first connection end part of the connector female end is in clearance fit with the second end part of the connector male end, so that the first connection end part of the connector female end is conveniently inserted into the other end part of the connector male end or the other end part of the connector male end is conveniently inserted into the first connection end part of the connector female end.

In any one of the above technical solutions, the first connection end part of the connector female end is sleeved at the outer side of the second end part of the connector male end, and a difference between an inner diameter of the first connection end part of the connector female end and an outer diameter of the second end part of the connector male end is 0.5 mm±0.3 mm. Or, the second end part of the connector male end is sleeved at the outer side of the first connection end part of the connector male end, and a difference between an inner diameter of the second end part of the connector male end and an outer diameter of the first connection end part of the connector female end is 0.5 mm±0.3 mm.

In any one of the above technical solutions, the dehumidifier includes a water pump disposed at the middle partition. A second water inlet pipe is connected between the water pump and the second connection end part of the connector female end, and the water pump is configured to pump out the water in the accommodating space.

The water pump is connected with a drain pipe. When the water pump pumps the water, the condensed water in the accommodating space passes the filter member, the first water inlet pipe, the connector male end, the connector female end, the second water inlet pipe, the water pump and the drain pipe, and then is discharged out of the dehumidifier.

In any one of the above technical solutions, the dehumidifier includes a housing. The middle partition is located in the housing and divides a space in the housing into a water tank area and a non-water-tank area. A heat exchanger of the dehumidifier is located in the non-water-tank area. The water tank is detachably disposed in the water tank area.

Further, the non-water-tank area is located above the water tank area. The heat exchanger is located above the middle partition. A compressor and the water tank are located below the middle partition. The middle partition supports the heat exchanger. The water tank is detachably disposed in the water tank area, so that the water tank can be conveniently pushed into the water tank area or withdrawn from the water tank area.

In any one of the above technical solutions, the middle partition is provided with a water receiving tray, and the heat exchanger is located above the water receiving tray.

The water receiving tray is located below the heat exchanger to receive the condensed water produced by the heat exchanger. Further, the water receiving tray is located right below the heat exchanger.

In any one of the above technical solutions, the water receiving tray includes a water collection groove. The middle partition is provided with a drain connector in communication with the water collection groove. The drain connector is provided with a switch configured to open or close the drain connector. The middle partition is further provided with a drain opening configured to communicate the water collection groove and the accommodating space.

A part of the water receiving tray is recessed to form the water collection groove. The drain connector is provided with the switch. The drain connector is further connected with a standby drain pipe. When the switch is opened, the condensed water in the water collection groove maybe discharged successively through the drain connector and the standby drain pipe. When the switch is closed, the condensed water in the water collection groove cannot be discharged through the drain connector. The bottom of the drain opening is higher than the drain connector. When the condensed water in the water collection groove reaches a given amount, the condensed water in the water collection groove flows into the accommodating space of the water tank through the drain opening and is discharged through the connector male end and the connector female end under the action of the water pump. Under normal conditions, the switch is in a closed state, and the condensed water in the water collection groove flows into the accommodating space of the water tank through the drain opening. The switch may be a plug which can be disposed in the drain connector in a pluggable manner. When the plug is pulled out, the drain connector is opened. When the drain connector is plugged by the plug, the drain connector is closed.

Additional aspects and advantages of the present application will become apparent in the following description or can be known through the practice of the present application.

BRIEF DESCRIPTION OF THE DRAWINGS

The above and/or additional aspects and advantages of the present application will become apparent and easily understood from the following description of embodiments in conjunction with the drawings.

The corresponding relationship between the reference signs and component names in FIGS. 1 to 20 is as follows: 1 water tank, 11 accommodating space, 12 mounting hole, 13 first buckle part, 14 water tank body, 15 water tank cover, 21 connector female end, 211 first connection end part, 212 second connection end part, 213 sealing groove, 22 middle partition, 221 water collection groove, 222 drain connector, 223 drain opening, 224 water receiving tray, 3 connector male end assembly, 31 connector male end, 311 first end part, 312 second end part, 313 first guiding slant, 32 support, 321 support body, 322 connection part, 323 second buckle part, 324 limiting part, 325 limiting groove, 4 first water inlet pipe, 5 second water inlet pipe, 6 filter member, 7 sealing member, 8 anti-dropping member, 82 second guiding slant, 9 screw, 10 water pump.

DETAILED DESCRIPTION OF THE EMBODIMENTS

For more clearly understanding the above object, features and advantages of the present application, a further detailed description of the present application will be given below in combination with accompanying drawings and embodiments. It should be noted that embodiments in the present application and features in embodiments maybe mutually combined.

In the following description, many specific details are set forth in order to fully understand the present application. However, the present application may also be implemented in other manners than those described herein. Therefore, the scope of protection of the present application is not limited to the specific embodiments described below.

A dehumidifier according to some embodiments of the present application is described below with reference to FIGS. 1 to 20.

Figure 9:
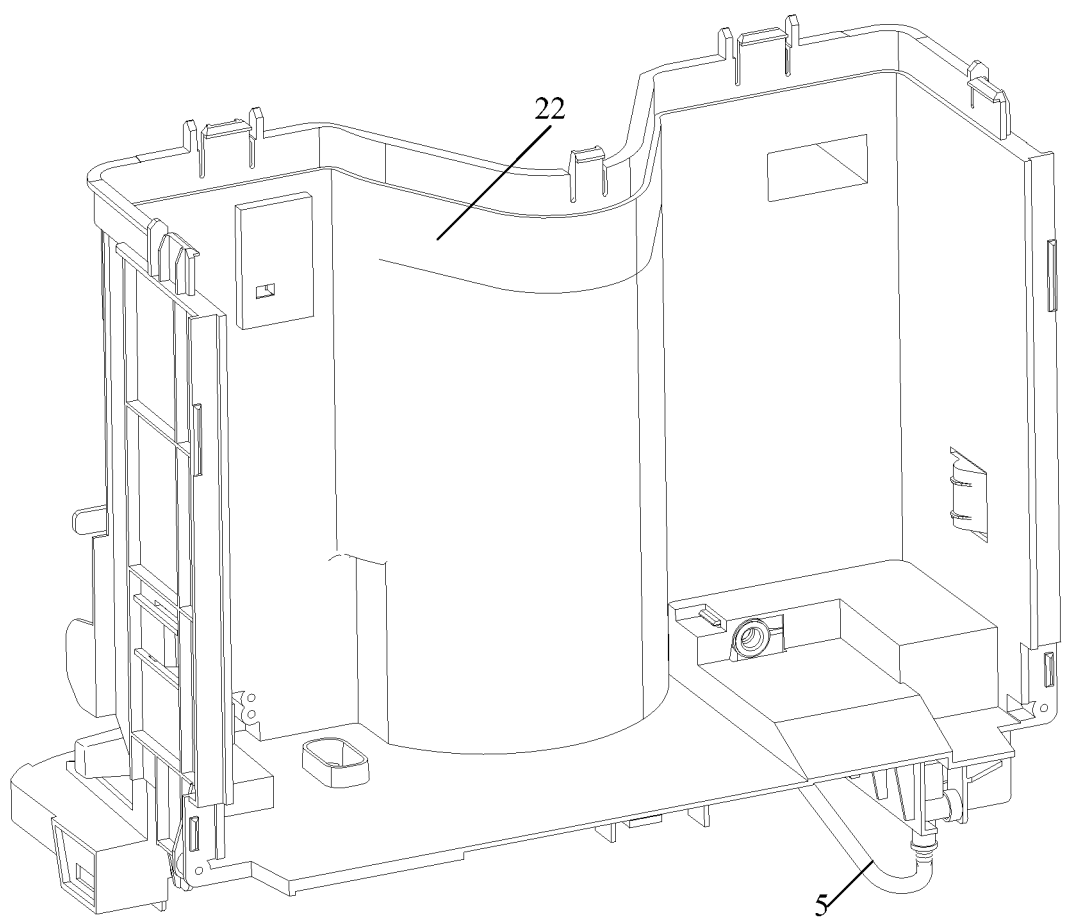
FIG. 9 is a schematic structural diagram of an assembly structure of a middle partition, a water pump and the connector female end according to embodiment I of the present application from a first viewing angle.
Figure 10:
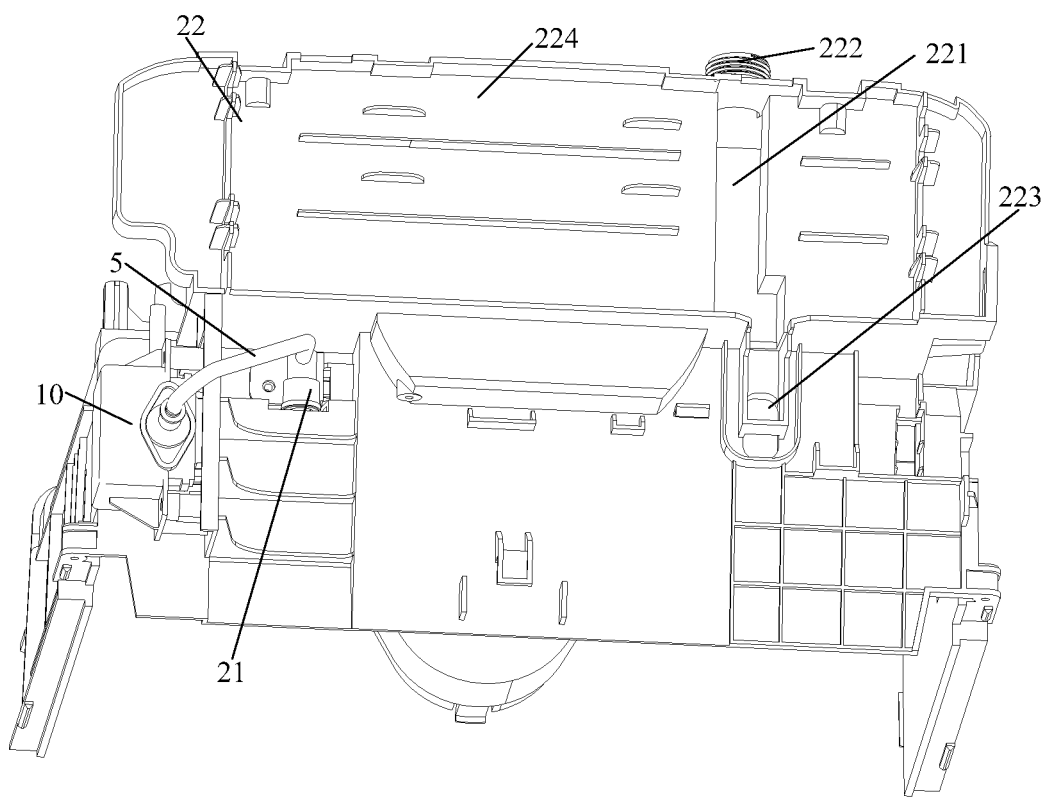
FIG. 10 is a schematic structural diagram of the assembly structure of the middle partition, the water pump and the connector female end according to embodiment I of the present application from a second viewing angle.
Figure 11:
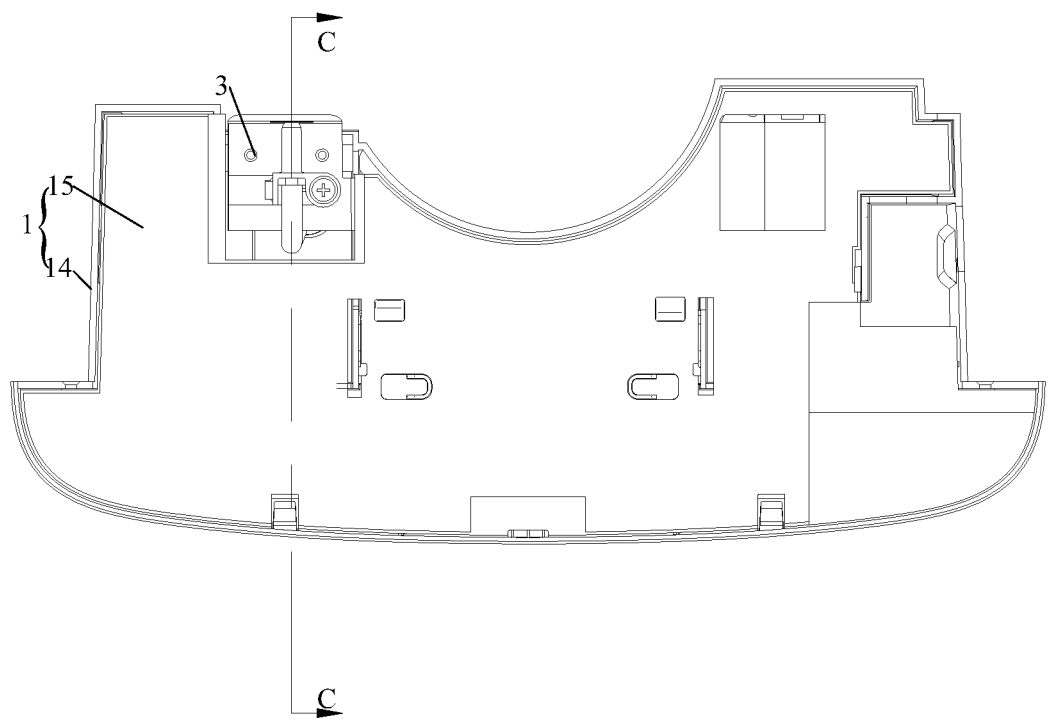
FIG. 11 is a schematic structural diagram of an assembly structure of a water tank and the connector male end assembly according to embodiment I of the present application from a first viewing angle.
Figure 12:
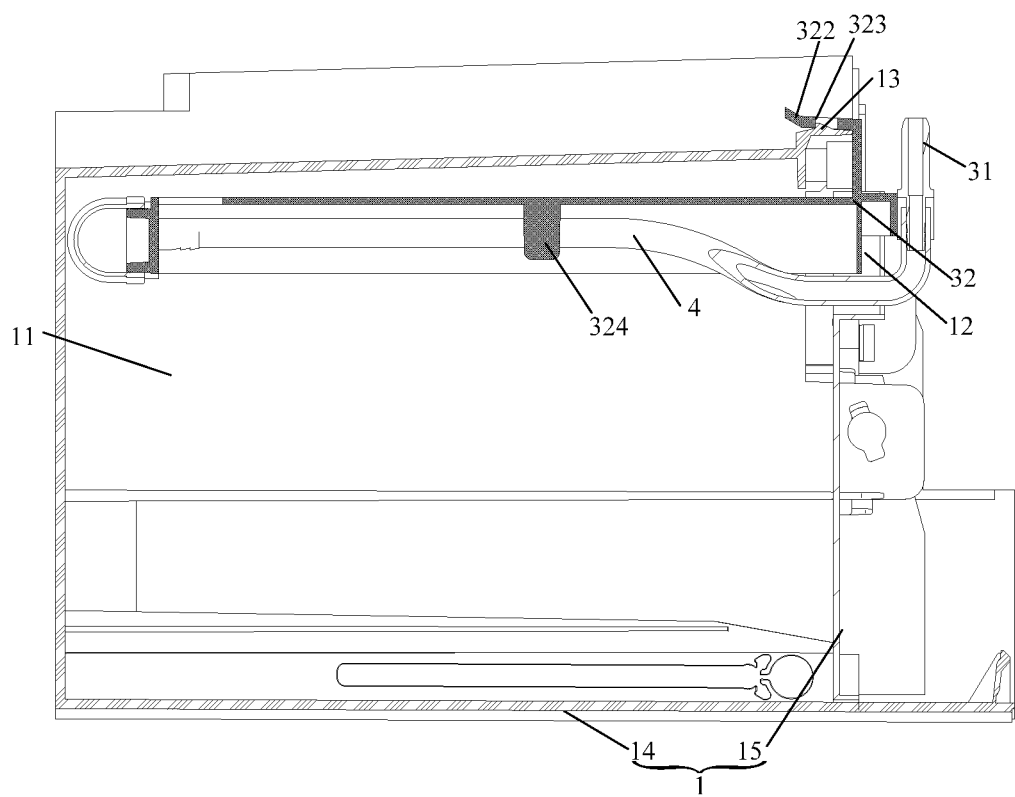
FIG. 12 is a schematic sectional structural diagram in a C-C direction in FIG. 11.
Figure 13:
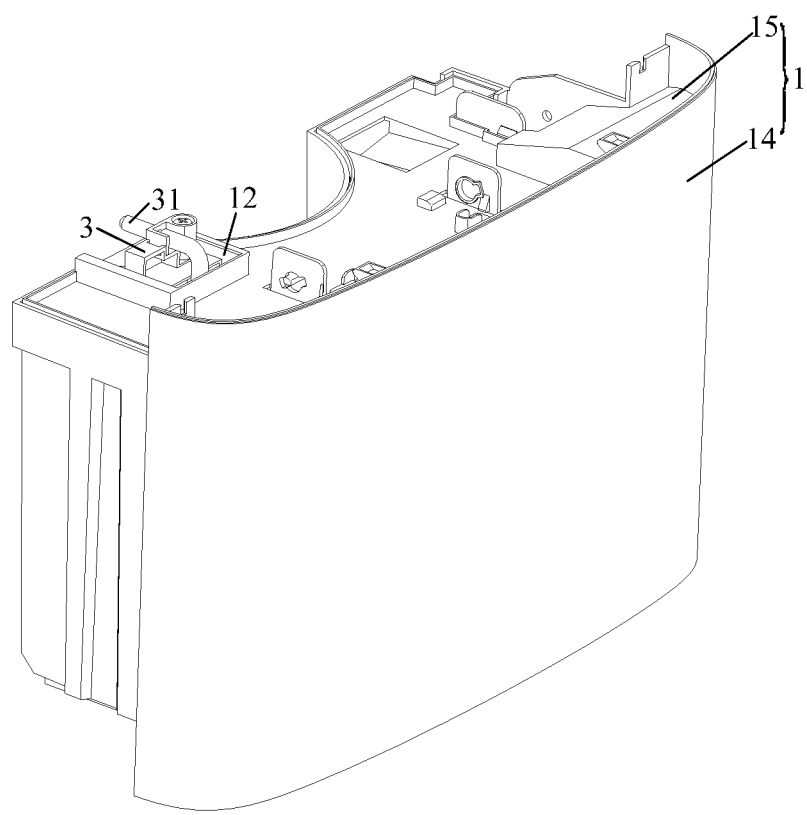
FIG. 13 is a schematic structural diagram of the assembly structure of the water tank and the connector male end assembly according to embodiment I of the present application a second viewing angle.
Figure 14:
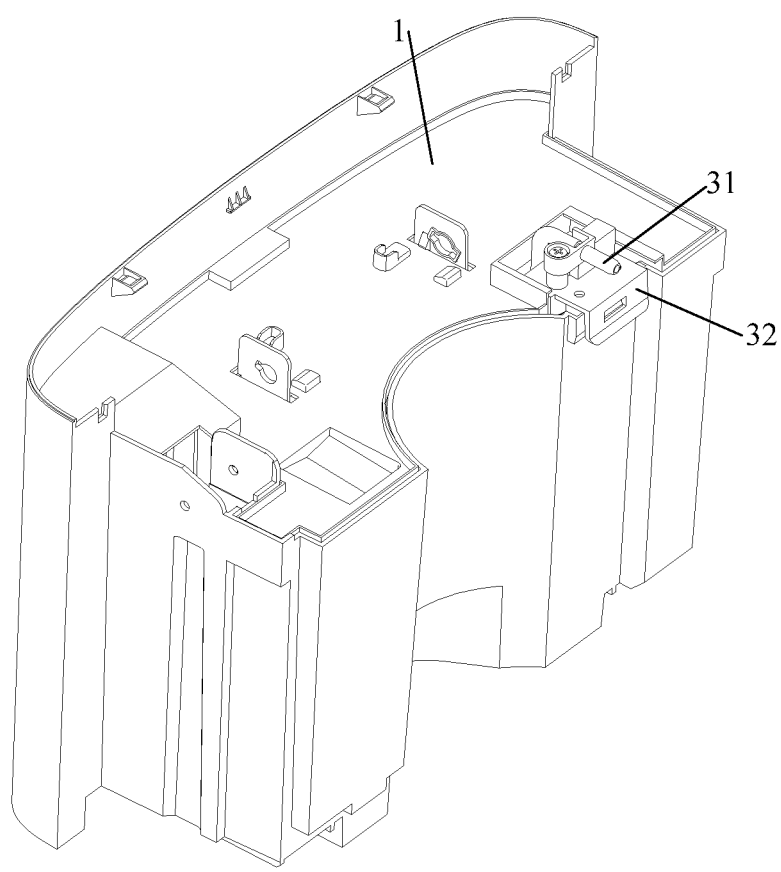
FIG. 14 is a schematic structural diagram of the assembly structure of the water tank and the connector male end assembly according to embodiment I of the present application from a third viewing angle.
Figure 15:
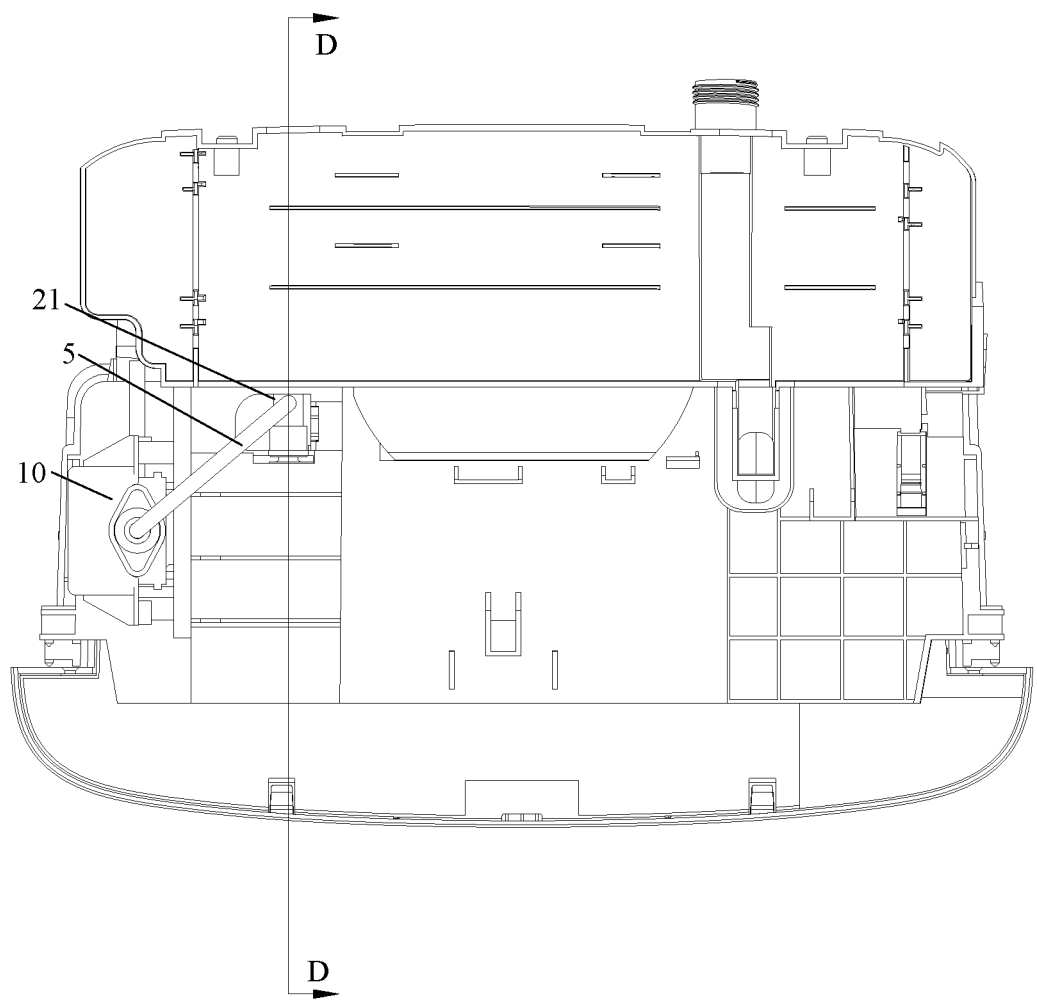
FIG. 15 is a schematic structural diagram of an assembly structure of the water tank and the middle partition according to embodiment I of the present application.
Figure 16:
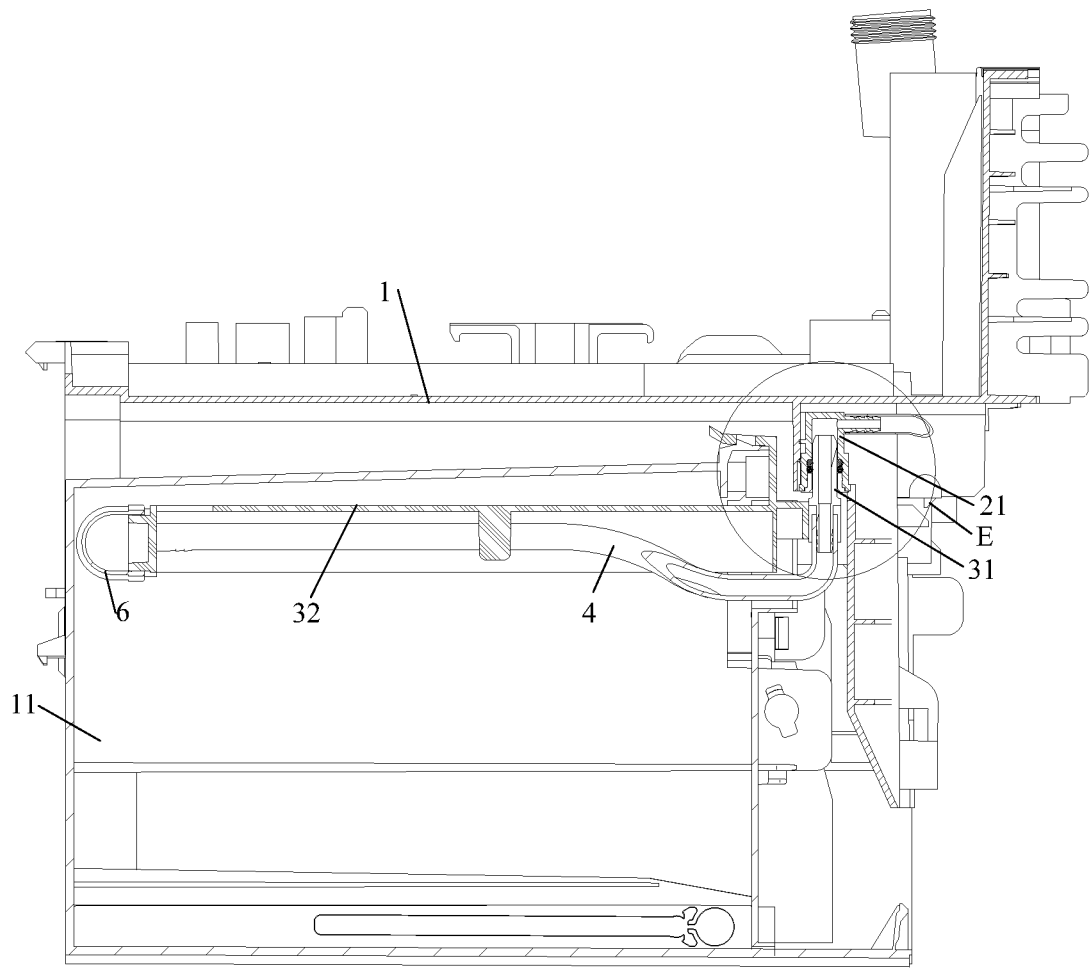
FIG. 16 is a schematic sectional structural diagram in a D-D direction in FIG. 15.

A dehumidifier according to some embodiments of the present application includes a water tank 1, a connector male end assembly 3, a connector female end 21 and a middle partition 22. As shown in FIG. 11 and FIG. 12, the water tank 1 includes an accommodating space 11. As shown in FIG. 13 and FIG. 14, the connector male end assembly 3 is disposed at the water tank 1. The connector male end assembly 3 includes a connector male end 31. A first end part 311 of the connector male end 31 is in communication with the accommodating space 11. As shown in FIG. 9 and FIG. 10, the connector female end 21 is disposed at the middle partition 22. As shown in FIG. 15 to FIG. 18, a second end part 312 of the connector male end 31 is connected with a first connection end part 211 of the connector female end 21.

In the dehumidifier provided by the above embodiment of the present application, the accommodating space 11 is configured to accommodate condensed water produced when the dehumidifier works. The connector male end 31 is connected with the connector female end 21, so that the connector female end 21 is in communication with the accommodating space 11. The condensed water in the accommodating space 11 successively passes the connector male end 31 and the connector female end 21 and then is discharged out of the dehumidifier. The first end part 311 and the second end part 312 are opposite to and in communication with each other. The first connection end part 211 and the second connection end part 212 are opposite to and in communication with each other. The condensed water in the water tank 1 is discharged successively from the first end part 311, the second end part 312, the first connection end part 211 and the second connection end part 212.

In the present application, the connector female end 21 is directly disposed at the middle partition 22 instead of being disposed at a mounting seat, and the mounting seat is omitted, so that the cost of the dehumidifier is reduced, and the assembling efficiency of the dehumidifier is improved.

Embodiment I

A dehumidifier includes a water tank 1, a connector male end assembly 3, a connector female end 21 and a middle partition 22. The water tank 1 includes an accommodating space 11. The connector male end assembly 3 is disposed at the water tank 1. The connector male end assembly 3 includes a connector male end 31. A first end part 311 of the connector male end 31 is in communication with the accommodating space 11. The connector female end 21 is disposed at the middle partition 22. A second end part 312 of the connector male end 31 is connected with a first connection end part 211 of the connector female end 21.

Figure 7:
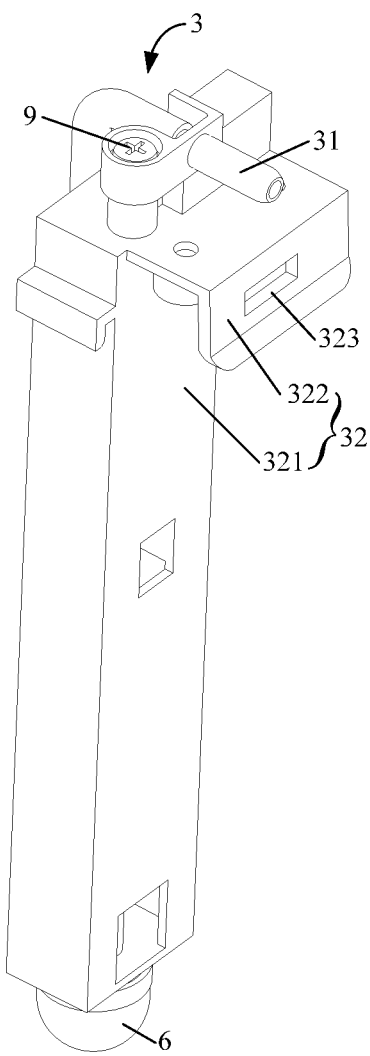
FIG. 7 is a schematic structural diagram of the connector male end assembly according to embodiment I of the present application from a second viewing angle.
Figure 8:
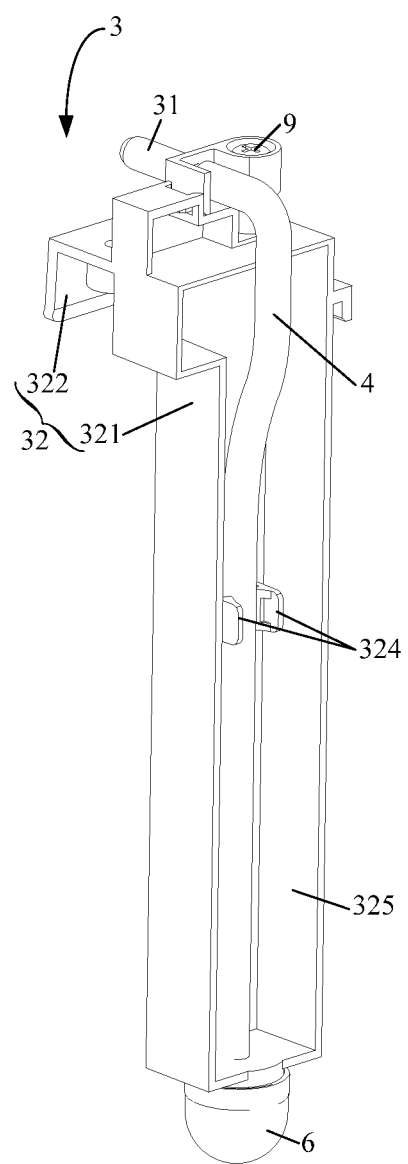
FIG. 8 is a schematic structural diagram of the connector male end assembly according to embodiment I of the present application from a third viewing angle.

As shown in FIG. 7 and FIG. 8, the connector male end assembly 3 includes a support 32. The support 32 is disposed at the water tank 1. The connector male end 31 is disposed at the support 32.

As shown in FIG. 13 and FIG. 14, the connector male end 31 is disposed at the water tank 1 through the support 32, so that the connector male end 31 is fixed on the water tank 1. The water tank 1 includes a water tank body 14 and a water tank cover 15 disposed at the water tank body 14. The support 32 may be disposed at the water tank cover 15, so that the connector male end assembly 3 is disposed at the top of the water tank 1.

Figure 1:
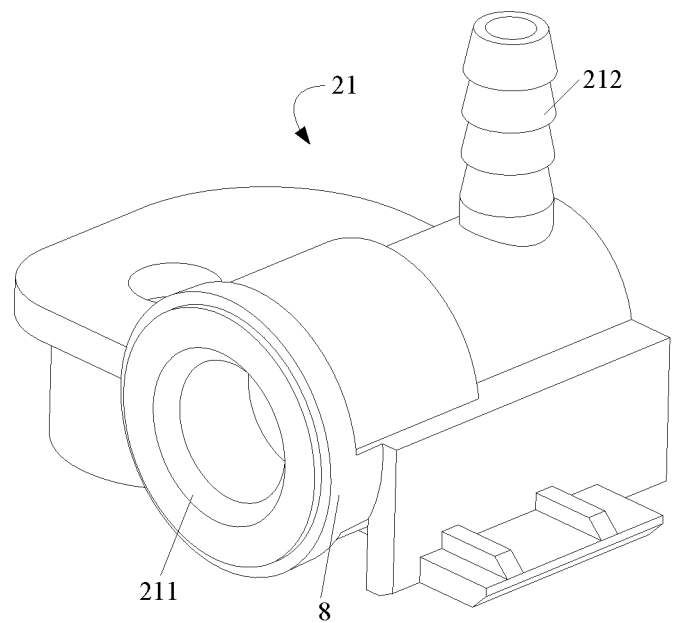
FIG. 1 is a schematic structural diagram of a connector female end according to embodiment I of the present application from one viewing angle.
Figure 2:
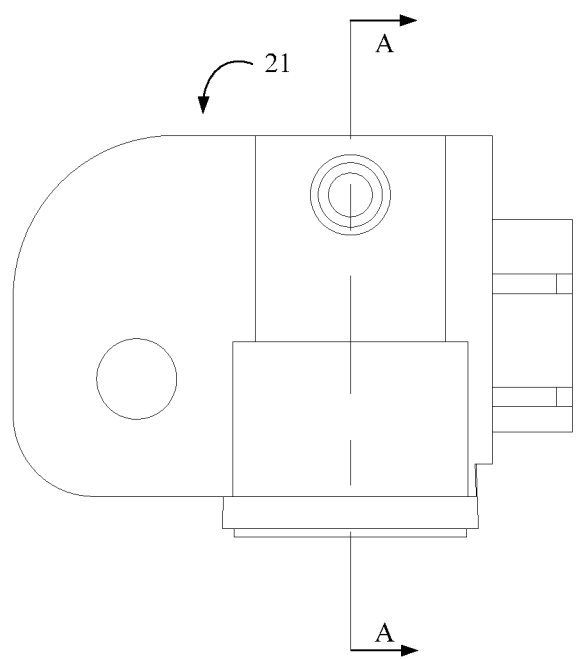
FIG. 2 is a schematic structural diagram of the connector female end according to embodiment I of the present application from another viewing angle.
Figure 3:
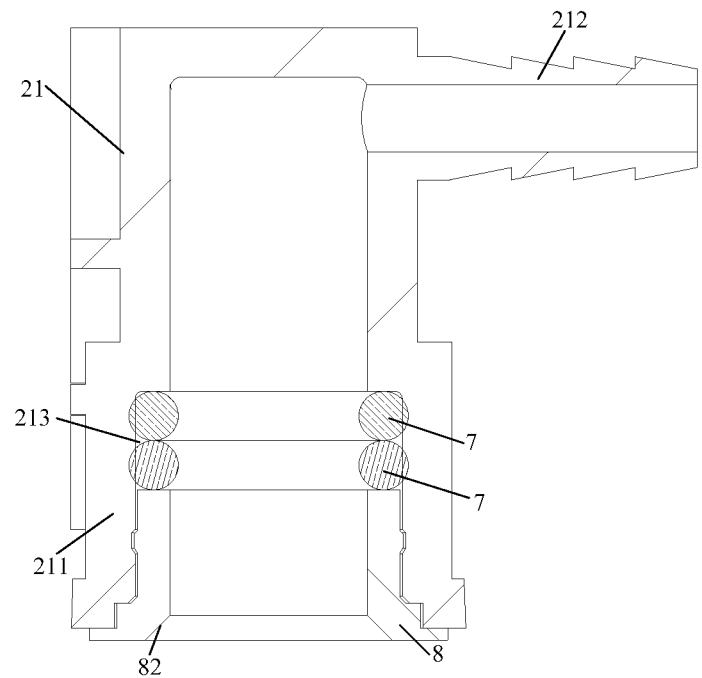
FIG. 3 is a schematic sectional structural diagram in an A-A direction in FIG. 2.
Figure 4:
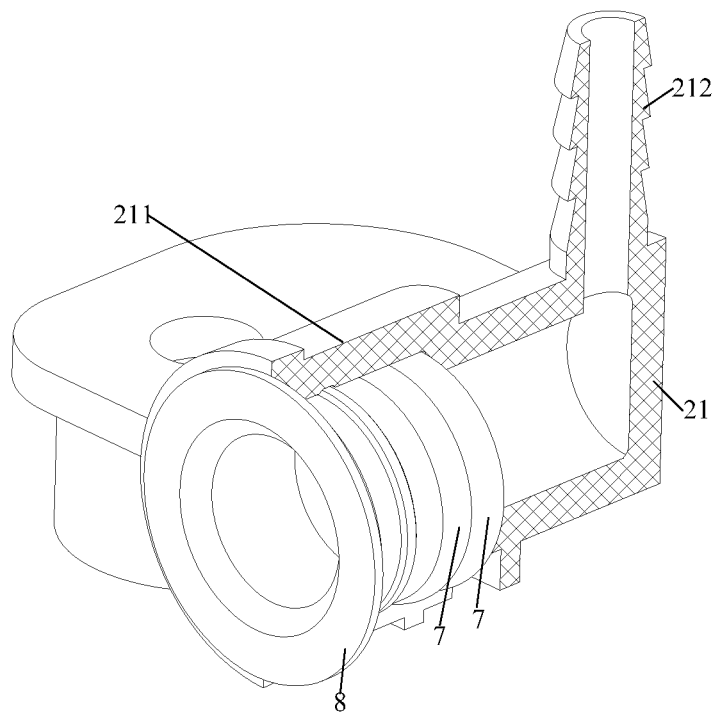
FIG. 4 is a schematic sectional structural diagram of the connector female end shown in FIG. 1.
Figure 5:
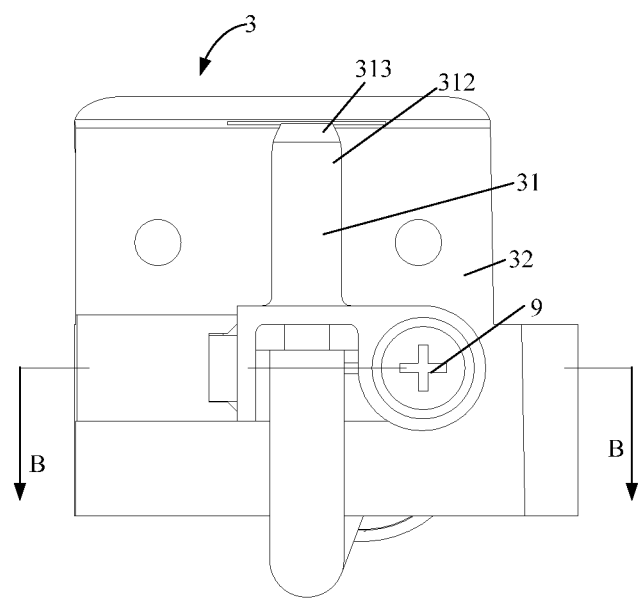
FIG. 5 is a schematic structural diagram of a connector male end assembly according to embodiment I of the present application from a first viewing angle.

The connector male end 31 is disposed at the support 32. The connector male end 31 may be fixedly or detachably connected with the support 32. For example, the connector male end 31 is buckled with the support 32 or connected with the support through a fastener or bonded with the support or in soldering connection with the support. As shown in FIG. 5, the connector male end 31 is fixed on the support through a screw 9.

In some embodiments, the support 32 is detachably connected with the water tank 1.

When the water tank 1 needs to be cleaned or the connector male end assembly 3 needs to be repaired or replaced, the support 32 can be removed from the water tank 1 for easy operation.

In some embodiments, as shown in FIG. 7 and FIG. 8, the support 32 includes a support body 321 and a connection part 322. The support body 321 is connected with the connection part 322 and connected with the water tank 1 through the connection part 322. The connection part 322 is located outside the accommodating space 11. As shown in FIG. 12, a first buckle part 13 is disposed at an outer wall of the water tank 1. The connection part 322 is provided with a second buckle part 323 matched with the first buckle part 13, and the first buckle part 13 and the second buckle part 323 are matched, so that the water tank 1 is buckled with the support 32.

In order to further improve the convenience for mounting the connection part 322 onto the water tank 1 or removing the connection part 322 from the water tank 1, the connection part 322 is disposed at the outer side of the accommodating space 11 and detachably connected with an outer surface of a side wall of the water tank body 14. For example, the second buckle part 323 is disposed at the connection part 322. The first buckle part 13 is disposed at the outer surface of the side wall of the water tank body 14. One of the first buckle part 13 and the second buckle part 323 is a buckling groove, and the other one is a buckle matched with the buckling groove. It can be understood that the water tank 1 may also be in thread connection with the connection part 322, or the water tank 1 is connected with the connection part 322 through screws or bolts.

In some embodiments, as shown in FIG. 11 and FIG. 12, the connector male end assembly 3 includes a first water inlet pipe 4. One end of the first water inlet pipe 4 is connected with a first end part 311 of the connector male end 31, and the other end of the first water inlet pipe 4 is located in the accommodating space 11. The connector male end 31 is in communication with the accommodating space 11 through the first water inlet pipe 4.

In some embodiments, as shown in FIG. 12, the support 32 includes a support body 321. The water tank 1 is provided with a mounting hole 12. The support body 321 at least partially stretches into the accommodating space 11 through the mounting hole 12. A limiting part 324 is disposed at the support body 321. The first water inlet pipe 4 is limited in the limiting part 324.

The support body 321 is disposed at the water tank 1. The support body 321 extends along a length direction of the first water inlet pipe 4. The first water inlet pipe 4 is disposed at the support body 321. In order to position the first water inlet pipe 4 and prevent the shaking of the first water inlet pipe 4 relative to the accommodating space 11, the support body 321 is provided with a limiting hole 325. A limiting part 324 is disposed at a wall of the limiting hole 325. The first water inlet pipe 4 is limited in the limiting part 324. The limiting part 324 may be a plurality of bulges disposed at the support body 321. The bulges are respectively located at two opposite sides of the first water inlet pipe 4. The first water inlet pipe 4 is limited among the bulges.

It should be noted that the connector male end assembly 3 may be sealed to the water tank 1 or may not be sealed to the water tank.

Figure 6:
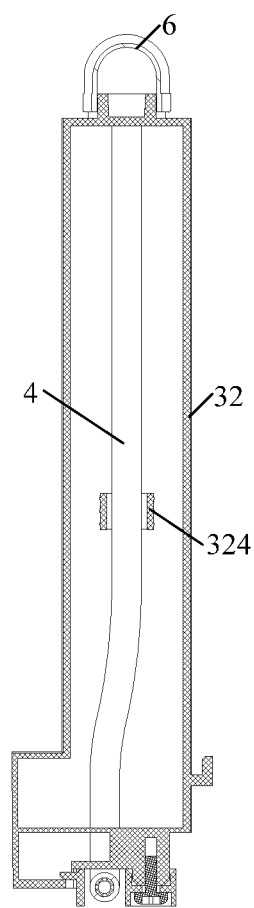
FIG. 6 is a schematic sectional structural diagram in a B-B direction in FIG. 5.

In some embodiments, as shown in FIG. 6, the other end of the first water inlet pipe 4 is connected with a filter member 6.

The upper end of the first water inlet pipe 4 is connected with the connector male end 31, and the lower end of the first water inlet pipe 4 is located at the bottom of the accommodating space 11. In order to prevent impurities in the condensed water from entering a water pump 10, blocking the water pump 10, and shortening the service life of the water pump 10, the lower end of the first water inlet pipe 4 is connected with the filter member 6. The filter member 6 may be but not limited to a filter screen. The filter screen is sleeved at the lower end of the first water inlet pipe 4.

The connector male end assembly 3 is detachably connected with the water tank 1 through the connection part, so that when the filter member 6 needs to be cleaned, the connector male end assembly 3 is taken out of the water tank 1 without disassembling the water tank 1.

Figure 17:
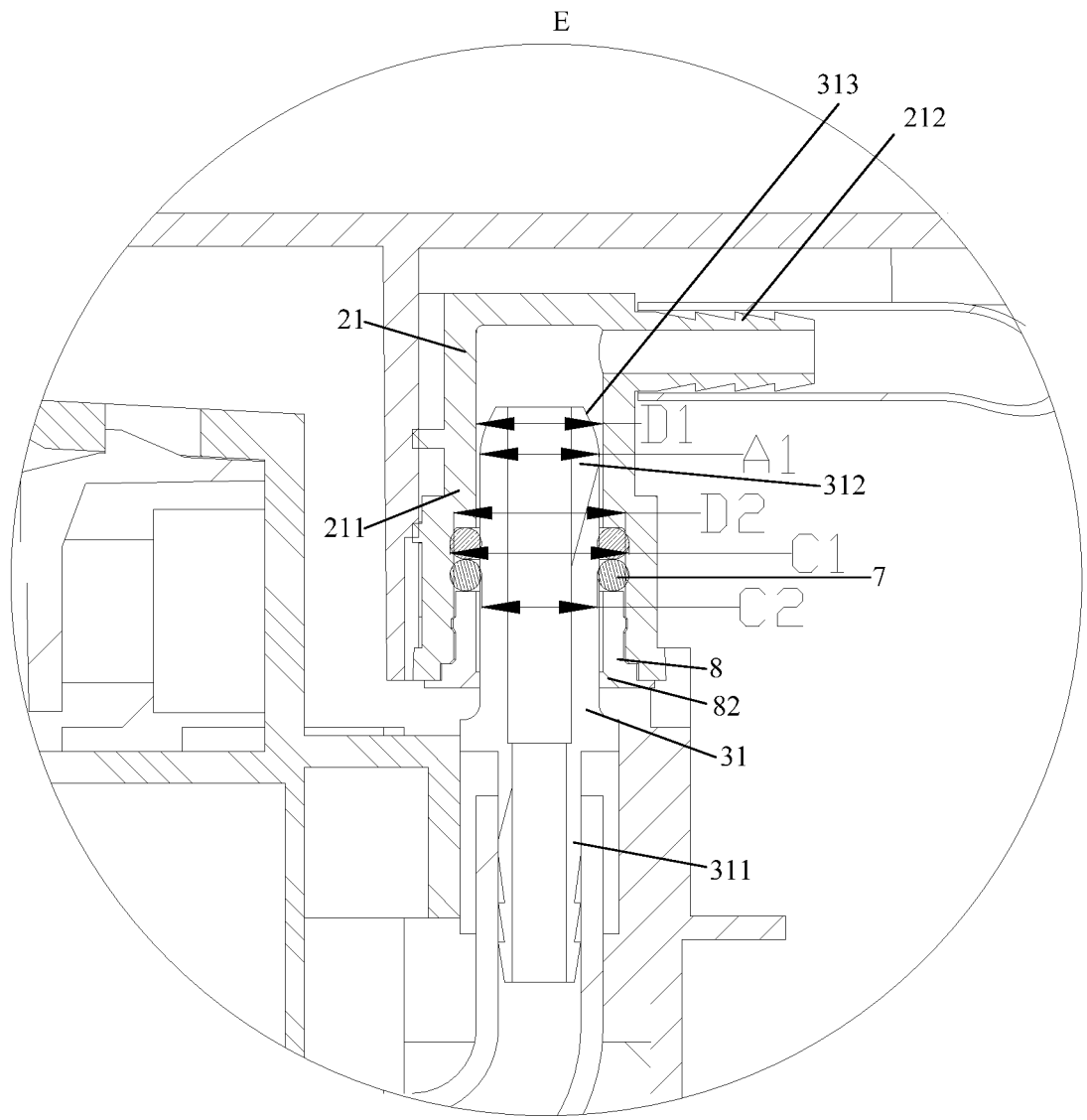
FIG. 17 is an enlarged schematic structural diagram of a portion E in FIG. 16.
Figure 18:
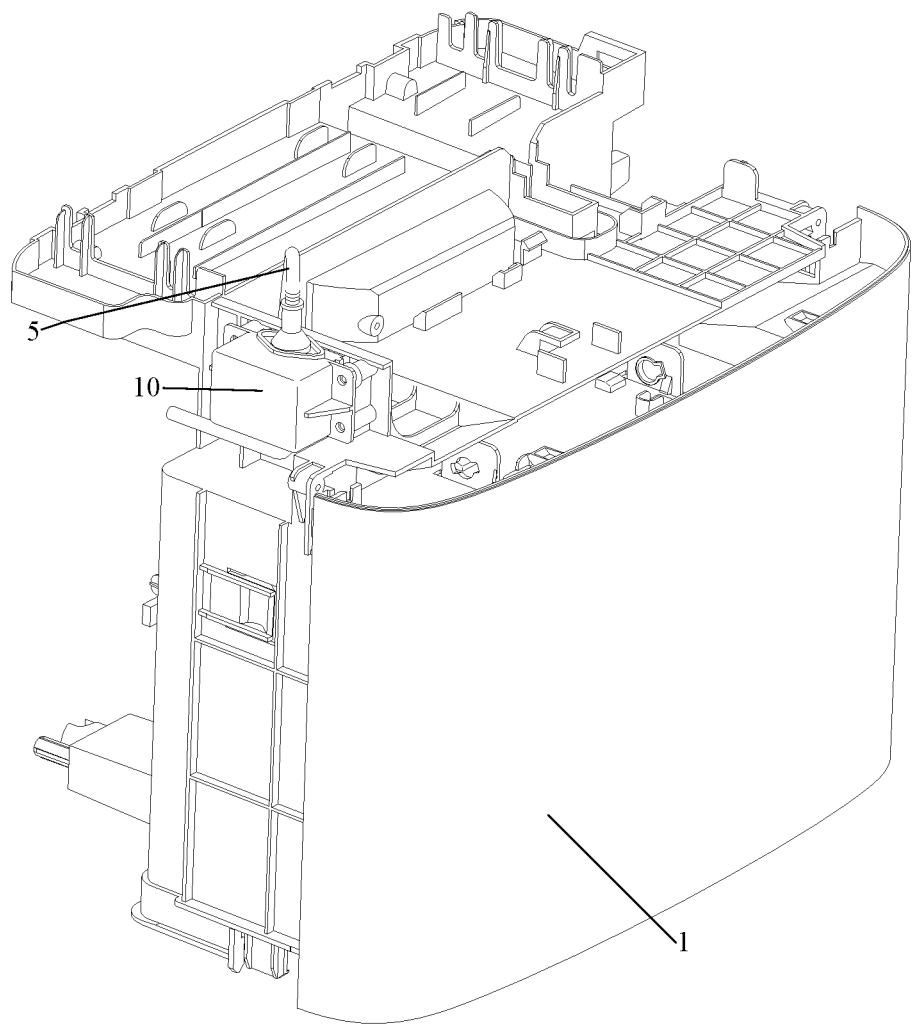
FIG. 18 is a schematic structural diagram of a second view of the assembly structure of the water tank and the middle partition according to embodiment I of the present application.

In some embodiments, as shown in FIG. 17, the second end part 312 of the connector male end 31 and the first connection end part 211 of the connector female end 21 are connected in a pluggable manner, and a sealing member 7 is disposed between the second end part 312 of the connector male end 31 and the first connection end part 211 of the connector female end 21.

Figure 19:
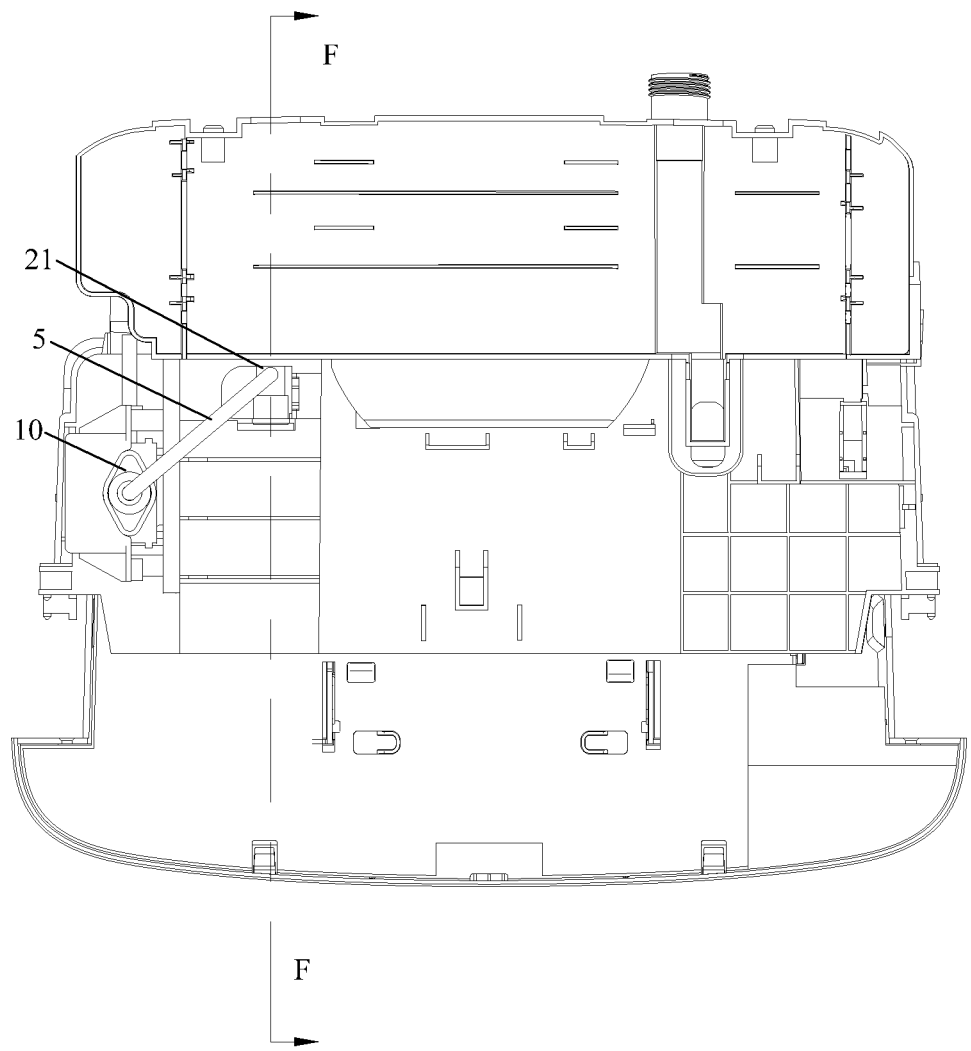
FIG. 19 is a schematic structural diagram showing a disassembling process of the water tank and the middle partition according to embodiment I of the present application.
Figure 20:
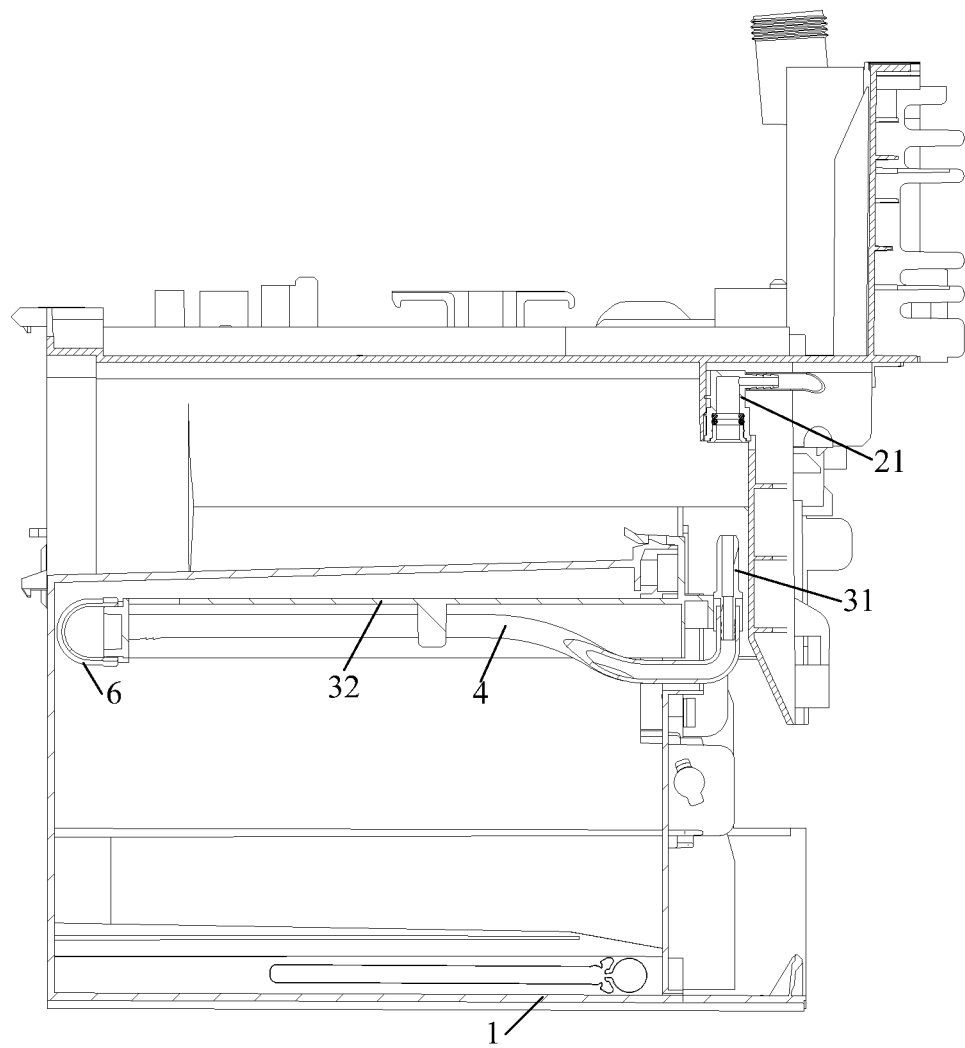
FIG. 20 is a schematic sectional structural diagram in an E-E direction in FIG. 19.

The first connection end part 211 of the connector female end 21 is sleeved at the outer side of the second end part 312 of the connector male end 31, and the second end part 312 of the connector male end 31 is connected with the first connection end part 211 of the connector female end 21 in a pluggable manner, thereby facilitating the connection and disassembling of the connector male end 31 and the connector female end 21. The sealing member 7 is disposed between the second end part 312 of the connector male end 31 and the first connection end part 211 of the connector female end 21, thereby realizing the sealing between the connector male end 31 and the connector female end 21. The sealing member 7 may be but not limited to a sealing ring. As shown in FIG. 19 and FIG. 20, a process of separating the middle partition 22 and the water tank is shown. The connector male end is separated from the connector female end.

The number of the sealing members 7 may be one or more. When a plurality of sealing members 7 are provided, the sealing members 7 are disposed in sequence along a flowing direction of a water flow.

In some embodiments, as shown in FIG. 1, FIG. 2, FIG. 3 and FIG. 4, the sealing groove 213 for accommodating the sealing member 7 is disposed at the inner side of the first connection end part 211 of the connector female end 21 or the outer side of the second end part 312 of the connector male end 31, and the anti-dropping member 8 is disposed at the inner side of the first connection end part 211 of the connector female end 21 or the outer side of the second end part 312 of the connector male end 31. The sealing member 7 is limited between the anti-dropping member 8 and the sealing groove 213. The sealing member 7 is at least partially located in the sealing groove 213. The anti-dropping member 8 may be a snap spring, and the snap spring is disposed at the front end of the connector female end 21. Along the flowing direction of the water flow in the connector female end 21, the front end and the rear end of the connector female end 21 are disposed successively. The anti-dropping member 8 may also be a limiting bulge formed by inwards protruding an inner wall of the first connection end part 211 of the connector female end 21 or a limiting bulge formed by outwards protruding an outer wall of the connector male end 31. As shown in FIG. 17, the number of the sealing members is two. The sealing members are O-shaped rings. The two O-shaped rings are disposed side by side inside a first inner ring of the connector female end. The snap spring is disposed at the front ends of the O-shaped rings and the connector female end.

In some embodiments, as shown in FIG. 17, the second end part 312 of the connector male end 31 is provided with a first guiding slant 313. The anti-dropping member 8 is located between the second end part 312 of the connector male end 31 and the first connection end part 211 of the connector female end 21. The anti-dropping member 8 is provided with a second guiding slant 82 matched with the first guiding slant 313. The first guiding slant 313 and the second guiding slant 82 are disposed, so that the connector male end 31 can be smoothly inserted into the connector female end 21. Along a direction where the connector male end 31 is inserted into the connector female end 21, the outer wall of the second end part 312 of the connector male end 31 inclines inwards to form the first guiding slant 313. The anti-dropping member 8 is sleeved at the outer side of the second end part 312 of the connector male end 31. Along the direction where the connector male end 31 is inserted into the connector female end 21, the inner wall of the anti-dropping member 8 inclines inwards.

In some embodiments, the sealing member 7 is in interference fit with the second end part 312 of the connector male end 31, thereby improving the sealing performance between the sealing member 7 and the connector male end 31. The sealing member 7 is in interference fit with the first connection end part 211 of the connector female end 21, thereby improving the sealing performance between the sealing member 7 and the connector female end 21.

The sealing member 7 is disposed between the first connection end part 211 of the connector female end 21 and the second end part 312 of the connector male end 31. Specifically, the sealing member 7 is located at the inner side of the first connection end part 211 of the connector female end 21 and sleeved at the outer side of the second end part 312 of the connector male end 31.

In some embodiments, the sealing member 7 is in a ring shape. A difference between an outer diameter A1 of the second end part 312 of the connector male end 31 and an inner diameter C2 of the sealing member 7 is 0.5 mm±0.3 mm, i.e. A1-C2=0.5 mm±0.3 mm. A difference between an inner diameter D2 of the first connection end part 211 of the connector female end 21 and an outer diameter C1 of the sealing member 7 is 0.5 mm±0.3 mm, i.e. C1-D2=0.5 mm±0.3 mm.

In some embodiments, the first connection end part 211 of the connector female end 21 is in clearance fit with the second end part 312 of the connector male end 31, so that the first connection end part 211 of the connector female end 21 is inserted into the second end part 312 of the connector male end 31.

In some embodiments, a difference between an inner diameter D1 of the first connection end part 211 of the connector female end 21 and the outer diameter A1 of the second end part 312 of the connector male end 31 is 0.5 mm±0.3 mm, i.e. D1-A1=0.5 mm±0.3 mm.

In some embodiments, the dehumidifier includes a water pump 10. As shown in FIG. 9 and FIG. 10, the water pump 10 is disposed at the middle partition 22. A second water inlet pipe 5 is connected between the water pump 10 and the second connection end part 212 of the connector female end 21. The water pump 10 is configured to pump out the condensed water in the accommodating space 11.

The water pump 10 is connected with a drain pipe. When the water pump 10 pumps the water, the condensed water in the accommodating space 11 passes the filter member 6, the first water inlet pipe 4, the connector male end 31, the connector female end 21, the second water inlet pipe 5, the water pump 10 and the drain pipe, and then is discharged out of the dehumidifier.

In some embodiments, the dehumidifier includes a housing. The middle partition 22 is located in the housing and divides a space in the housing into a water tank area and a non-water-tank area. A heat exchanger of the dehumidifier is located in the non-water-tank area. The water tank is detachably disposed in the water tank area.

Further, the non-water-tank area is located above the water tank area. The heat exchanger is located above the middle partition 22. A compressor and the water tank 1 are located below the middle partition 22. The middle partition 22 supports the heat exchanger. The water tank 1 is detachably disposed in the water tank area, so that the water tank 1 can be conveniently pushed into the water tank area or withdrawn from the water tank area.

Further, the water tank is disposed at the middle partition 22 and detachably connected with the middle partition 22, for example, the water tank and the middle partition 22 are buckled with each other or are connected through a fastener.

The connector female end is fixed on the middle partition 22. The connector female end may be fixedly or detachably connected with the middle partition 22, for example, the connector female end is adhered onto the middle partition 22, or the connector female end is fixed on the middle partition 22 through the fastener, or the connector female end is in thread connection with the middle partition 22. Further, the middle partition 22 is provided with an accommodating hole matched with the connector female end. The connector female end is located in the accommodating hole.

Further, a water receiving tray 224 is disposed at the middle partition 22. The heat exchanger is located above the water receiving tray 224.

The water receiving tray 224 is located below the heat exchanger to receive the condensed water produced by the heat exchanger. Further, the water receiving tray 224 is located right below the heat exchanger.

Further, the water receiving tray 224 includes a water collection groove 221. A drain connector 222 and a drain opening 223 which are in communication with the water collection groove 221 are disposed at the middle partition 22. A switch for opening or closing the drain connector 222 is disposed at the drain connector 222. The drain opening 223 is in communication with the accommodating space 11.

A part of the water receiving tray 224 is recessed to form the water collection groove 221. The switch is disposed at the drain connector 222. The drain connector 222 is further connected with a standby drain pipe. When the switch is opened, the condensed water in the water collection groove 221 can be discharged successively through the drain connector 222 and the standby drain pipe. When the switch is closed, the condensed water in the water collection groove 221 cannot be discharged through the drain connector 222. The bottom of the drain opening 223 is higher than the drain connector 222. When the condensed water in the water collection groove 221 reaches a given amount, the condensed water in the water collection groove 221 flows into the accommodating space 11 of the water tank 1 through the drain opening 223 and is discharged through the connector male end 31 and the connector female end under the action of the water pump 10. Under normal conditions, the switch is in a closed state, and the condensed water in the water collection groove 221 flows into the accommodating space 11 of the water tank 1 through the drain opening 223. The switch may be a plug which can be disposed in the drain connector 222 in a pluggable manner. When the plug is pulled out, the drain connector 222 is opened. When the drain connector 222 is plugged by the plug, the drain connector 222 is closed.

The drain opening 223 may be located above the drain connector 222, i.e. the bottom of the drain opening 223 is higher than the drain connector 22. It can be understood that the drain opening 223 may also be located below the drain connector 222, or located at a same height as the drain connector 222.

Embodiment II

The difference from embodiment I lies in that: a second end part 312 of a connector male end 31 is sleeved at the outer side of a first connection end part 211 of a connector female end 21; a sealing groove 213 for accommodating a sealing member 7 is disposed at the inner side of the second end part 312 of the connector male end 31 or the outer side of the first connection end part 211 of the connector female end 21; an anti-dropping member 8 is disposed at the inner side of the second end part 312 of the connector male end 31 or the outer side of the first connection end part 211 of the connector female end 21; the sealing member 7 is limited between the anti-dropping member 8 and the sealing groove 213; the sealing member 7 is at least partially located in the sealing groove 213; the anti-dropping member 8 may be a snap spring, and the snap spring is disposed at the front end of the connector male end 31; along a flowing direction of a water flow in the connector male end 31, the front end and the rear end of the connector male end 31 are successively disposed; and the anti-dropping member 8 may also be a limiting bulge formed by inwards protruding an inner wall of the second end part 312 of the connector male end 31 or a limiting bulge formed by outwards protruding an outer wall of the connector female end 21.

The first connection end part 211 of the connector female end 21 is provided with a first guiding slant 313. The anti-dropping member 8 is located between the second end part 312 of the connector male end 31 and the first connection end part 211 of the connector female end 21. The anti-dropping member 8 is provided with a second guiding slant 82 matched with the first guiding slant 313. The first guiding slant 313 and the second guiding slant 82 are disposed, so that the connector male end 31 can be smoothly inserted into the connector female end 21. Along a direction where the connector female end 21 is inserted into the connector male end 31, an outer wall of the first connection end part 211 of the connector female end 21 inclines inwards to form the first guiding slant 313. The anti-dropping member 8 is sleeved at the outer side of the first connection end part 211 of the connector female end 21. Along a direction where the connector female end 21 is inserted into the connector male end 31, an inner wall of the anti-dropping member 8 inclines inwards.

The sealing member 7 is disposed between the first connection end part 211 of the connector female end 21 and the second end part 312 of the connector male end 31. Specifically, the sealing member 7 is located at the inner side of the second end part 312 of the connector male end 31 and sleeved at the outer side of the first connection end part 211 of the connector female end 21.

The sealing member 7 is in a ring shape. A difference between an outer diameter of the first connection end part 211 of the connector female end 21 and an inner diameter of the sealing member 7 is 0.5 mm±0.3 mm. A difference between an inner diameter of the second end part 312 of the connector male end 31 and an outer diameter of the sealing member 7 is 0.5 mm±0.3 mm.

The first connection end part 211 of the connector female end 21 is in clearance fit with the second end part 312 of the connector male end 31, so that the second end part 312 of the connector male end 31 is inserted into the first connection end part 211 of the connector female end 21 conveniently.

A difference between an inner diameter of the second end part 312 of the connector male end 31 and the outer diameter of the first connection end part 211 of the connector female end 21 is 0.5 mm±0.3 mm.

Based on the foregoing, in the dehumidifier provided by embodiments of the present application, the water tank is detachable and may be disposed in the water tank area and may also be taken out of the water tank area. When the water tank is mounted at the middle partition, the connector male end is inserted into the connector female end. The sealing member has a sealing effect on inner cavities of the connector male end and the connector female end and realizes the connection reliability of the water pump. Moreover, the mounting seat is omitted, so that the dehumidifier is simple in structure and convenient to install, and the production efficiency is improved.

In the description of the present application, the term "plurality" means two or more, unless otherwise expressly specified and defined. The terms "connection", "fixing" and the like should be understood in a broad sense, unless otherwise expressly specified and defined. For example, "connection" may be a fixed connection, a detachable connection, an integral connection or an electric connection; the "connection" may be a direct connection or may be an indirect connection through an intermediate medium. For those of ordinary skill in the art, the meanings of the above terms in the present application may be understood according to concrete conditions.

In the description of the present application, it should be understood that the orientation or position relationships indicated by the terms "upper", "lower", "left", "right", "front", "back" and the like are the orientation or position relationships based on what is shown in the drawings, are merely for the convenience of describing the present application and simplifying the description, do not indicate or imply that the pointed device or unit must have a particular direction and be constructed and operated in a specific orientation, and thus cannot be understood as the limitation to the present application.

In the description of the present specification, descriptions of the terms "one embodiment", "some embodiments" and "specific embodiments" and the like mean that specific features, structures, materials or characteristics described in conjunction with the embodiment or example are included in at least one embodiment or example of the present application. In the specification, the schematic representation of the above terms does not necessarily refer to the same embodiment or example. Moreover, the particular features, structures, materials or characteristics described may be combined in any suitable manner in one or more embodiments or examples.

The above descriptions are only preferred embodiments of the present application, rather than being used to limit the present application. Those skilled in the art should understand that the present application may have a variety of modifications and changes. Any modification, equivalent replacement, improvement and the like made within the spirit and the principle of the present application shall fall within the scope of the present application.

What is claimed is:

1. A dehumidifier, comprising:
a water tank including an accommodating space;
a connector male end assembly disposed at the water tank, wherein:
the connector male end assembly comprises a connector male end;
a first end of the connector male end is in communication with the accommodating space; and
a second end of the connector male end is opposite to and in communication with the first end of the connector male end;
a middle partition;
a connector female end disposed at the middle partition, wherein:
a first end of the connector female end is connected with the second end part; and
a second end of the connector female end is opposite to and in communication with the first end of the connector female end; and
a water pump disposed at the middle partition and configured to pump water from the accommodating space to an outside of the dehumidifier, an inlet of the water pump being connected to the second end of the connector female end.

2. The dehumidifier according to claim 1, wherein the connector male end assembly further comprises a support disposed at the water tank, and the connector male end is disposed at the support.

3. The dehumidifier according to claim 2, wherein the support is detachably connected with the water tank.

4. The dehumidifier according to claim 3, wherein:
the support comprises a body and a connector part, the body is connected with the water tank through the connector part, and the connector part is located outside the accommodating space; and
the water tank is buckled with the support via a first buckle part at an outer wall of the water tank and a second buckle part at the connector part and matched with the first buckling part, or the water tank is in thread connection with the connector part, or the water tank is connected with the connector part through screws or bolts.

5. The dehumidifier according to claim 2, wherein the connector male end assembly comprises a water inlet pipe, one end of the water inlet pipe is connected with the first end of the connector male end, and another end of the water inlet pipe is located in the accommodating space.

6. The dehumidifier according to claim 5, wherein:
the water tank includes a mounting hole;
the support includes a body that at least partially stretches into the accommodating space through the mounting hole; and
the body includes two bulges located at two opposite sides of the water inlet pipe, respectively.

7. The dehumidifier according to claim 5, wherein the other end of the water inlet pipe is connected with a filter part.

8. The dehumidifier according to claim 1, wherein the second end of the connector male end is connected with the first end of the connector female end in a pluggable manner, and a seal is disposed between the second end of the connector male end and the first end of the connector female end.

9. The dehumidifier according to claim 8, wherein:
the first end of the connector female end is sleeved at an outer side of the second end of the connector male end;
a sealing groove for accommodating the sealing part is formed at an inner side of the first end of the connector female end or the outer side of the second end of the connector male end;
an anti-dropping member is disposed at the inner side of the first end of the connector female end or the outer side of the second end of the connector male end; and
the seal is limited between the anti-dropping member and the sealing groove.

10. The dehumidifier according to claim 9, wherein:
the second end of the connector male end includes a first guiding slant; and
the anti-dropping member is located between the second end of the connector male end and the first end of the connector female end, and includes a second guiding slant matched with the first guiding slant.

11. The dehumidifier according to claim 9, wherein the seal is in a ring shape, a difference between an outer diameter of the second end of the connector male end and an inner diameter of the seal is between 0.2 mm and 0.8 mm, and a difference between an inner diameter of the first end of the connector female end and an outer diameter of the seal is between 0.2 mm and 0.8 mm.

12. The dehumidifier according to claim 8, wherein:
the second end of the connector male end is sleeved at an outer side of the first end of the connector female end;
a sealing groove for accommodating the seal is formed at an inner side of the second end of the connector male end or the outer side of the first end of the connector female end;

an anti-dropping member is disposed at the inner side of the second end of the connector male end or the outer side of the first end of the connector female end; and the seal is limited between the anti-dropping member and the sealing groove.

13. The dehumidifier according to claim 12, wherein:
the first end of the connector female end includes a first guiding slant; and
the anti-dropping member is located between the second end of the connector male end and the first end of the connector female end, and includes a second guiding slant matched with the first guiding slant.

14. The dehumidifier according to claim 12, wherein the seal is in a ring shape, a difference between an outer diameter of the first end of the connector female end and an inner diameter of the seal is between 0.2 mm and 0.8 mm, and a difference between an inner diameter of the second end of the connector male end and an outer diameter of the seal is between 0.2 mm and 0.8 mm.

15. The dehumidifier according to claim 1, wherein:
the first end of the connector female end is sleeved at an outer side of the second end of the connector male end; and
a difference between an inner diameter of the first end of the connector female end and an outer diameter of the second end of the connector male end is between 0.2 mm and 0.8 mm.

16. The dehumidifier according to claim 1, wherein:
the second end of the connector male end is sleeved at the outer side of the first end of the connector female end; and
a difference between the inner diameter of the s second end of the connector male end and the outer diameter of the first end of the connector female end is between 0.2 mm and 0.8 mm.

17. The dehumidifier according to claim 1, further comprising:
a housing; and
a heat exchanger;
wherein:
the middle partition is located in the housing and divides a space in the housing into a water tank area and a non-water-tank area;
the heat exchanger is located in the non-water-tank area; and
the water tank is detachably disposed in the water tank area.

18. The dehumidifier according to claim 17, wherein a water receiving tray is disposed at the middle partition, and the heat exchanger is located above the water receiving tray.

19. The dehumidifier according to claim 18, wherein the water receiving tray includes a water collection groove, a drain connector in communication with the water collection groove is disposed at the middle partition, a switch configured to open or close the drain connector is disposed at the drain connector, and a drain opening configured to communicate the water collection groove with the accommodating space is formed in the middle partition.

20. The dehumidifier according to claim 1, wherein:
the water pump is further configured to pump water from the accommodating space, through the first end of the connector male end, the second end of the connector male end, the first end of the connector female end, the second end of the connector female end, and the water pump in order, to the outside of the dehumidifier.

* * * * *